Nov. 14, 1967  J. W. OSTERMAN  3,352,423
FILTER AND COALESCER ELEMENT
Filed April 8, 1965  3 Sheets-Sheet 1

INVENTOR.
JAMES W. OSTERMAN
BY
Fraser & Fraser
ATTORNEYS

United States Patent Office

3,352,423
Patented Nov. 14, 1967

3,352,423
FILTER AND COALESCER ELEMENT
James W. Osterman, Santa Clara, Calif., assignor to Filters, Inc., San Jose, Calif., a corporation of California
Filed Apr. 8, 1965, Ser. No. 446,488
3 Claims. (Cl. 210—496)

ABSTRACT OF THE DISCLOSURE

A liquid filter and coalescer element of fibrous material having a hollow cylindrical configuration wherein; the fibers are oriented to extend predominantly parallel to the longitudinal axis of the cylinder, a plurality of spaced apart grooves are formed in the inner surface of the cylinder, and a plurality of spaced apart slits are formed in the opposite surface to militate against any undue compacting of the fibers when the element is formed.

---

The present invention relates to an element for removing particulate and water content from hydrocarbon liquids. More particularly, the invention is concerned with a fibrous filter and coalescer element and a method of making the same which element is capable of filtering solid contaminants and coalescing water from aviation fuels.

Liquid fuels employed in fueling present day aircraft often contain solid particulate foreign contaminants and water which may occur as an admixture and may be present, in part, due to condensation effects. It has been found that the removal of the particulate and water contaminants can be successfully achieved by passing the contaminated fuel from the inside toward the outside through a cylindrical mass of fibrous material such as fibers of glass of the type manufactured and sold by Owens-Corning Fiberglas Corporation, of Toledo, Ohio. Elements constructed in accordance with the disclosure in United States Patent No. 3,061,107 entitled, "Filter Cartridge and Method of Making Same"—Lucian W. Taylor, have been found to perform in a completely satisfactory manner in respect to the removal of the above discussed undesirable contaminants.

Since the flow of the fuel to be treated is from the inside to the outside of such elements, the particulate material build-up is typically concentrated upon the surface of the innermost exposed portion thereof. In instances where the particular contaminant in the fuel is unusually high, the internal portion of the element may become clogged, causing an undue pressure drop across the element, thereby rendering the element inoperative. It must be appreciated that in such circumstances the outer portion of the element may be completely operative, but since the pressure drop caused by the clogged interior portion is above the maximum amount permitted, the entire element must be discarded.

It is the primary object of this invention to produce a new and improved filter and coalescer element for increasing the duty cycle thereof and a method of making the same.

Another object of the invention is to produce a fibrous fuel/water separator element having a centrally disposed core with longitudinally extending grooves therein for increasing the surface area thereof.

Still another object of the invention is to produce a new and improved method of fabricating the center core of a filter and coalescer element which may be suitably fabricated from a board of fibrous material which has been suitably compressed and bonded with a thermosetting binding agent to a specific density and thickness.

A still further object of the invention is to produce a new and improved filter and coalescer element which may be readily and economically manufactured.

The above and other objects and advantages of the invention will become readily apparent from reading the following detailed description of an embodiment of the invention when considered in the light of the accompanying drawings, in which.

Figure 1:
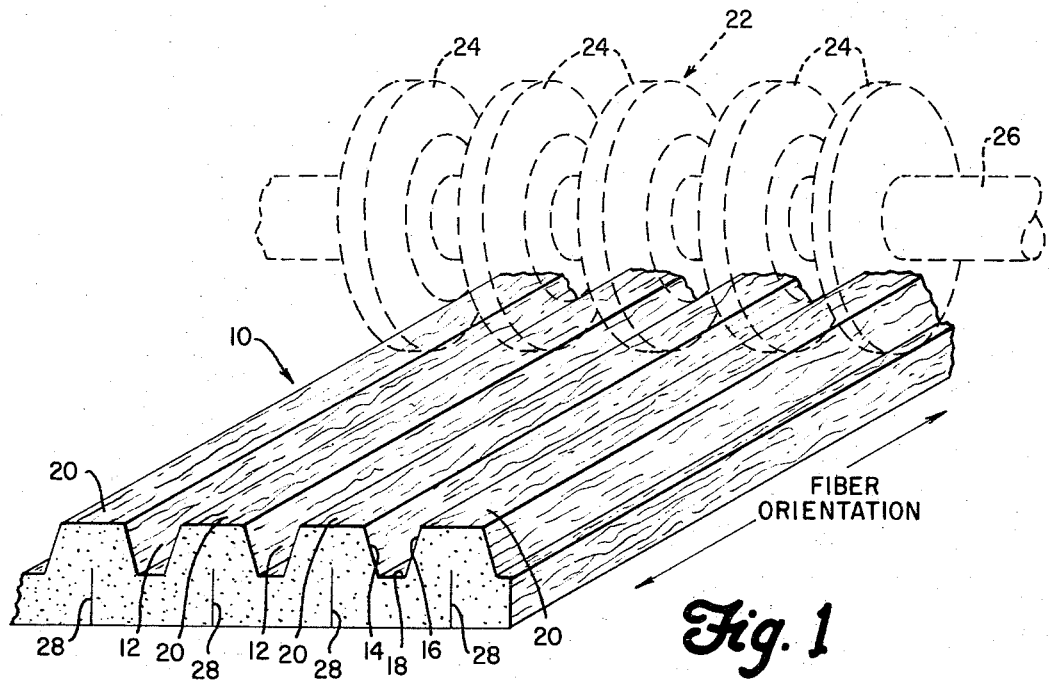
FIGURE 1 is a fragmentary perspective view of the basic product from which the central core of the filter and coalescer element is formed, specifically illustrating the formation of the grooves therein.

Referring to the drawings and more particularly to FIGURE 1, there is shown a portion of a board of resin-bonded fiber glass material, generally indicated by reference numeral 10. Preferably, the fiber glass board 10 is formed so that the fiber orientation is generally parallel to the length thereof for the purpose of incorporating strength in the product as will be more fully described hereinafter. The board 10 is provided with a plurality of parallelly disposed spaced apart grooves 12 extending longitudinally thereof. Each of the grooves 12 has a pair of opposed inclined walls 14 and 16, and a base 18. It will be observed that between adjacent grooves 12, there is a remaining portion of fiber glass materially of a generally truncated triangular shape in section having an upper land 20.

The grooves 12 are typically formed by a rotating cutter assembly 22, diagrammatically shown in dotted lines, having a plurality of spaced apart rotating cutter blades 24 fixedly mounted to a rotating shaft member 26. The shaft 26 is caused to rotate by a source of power coupled thereto, not shown. Either the rotating cutter assembly 22 is caused to be moved in a plane parallel to the fibrous board 10, or the board 10 is moved along a plane relative to the rotating cutter assembly 22 to form effectively the grooves 12 by the removal of a certain portion of the fibrous material therefrom.

The lower surface of the fibrous board 10 is provided with a plurality of parallelly extending spaced apart slits 28 which preferably are located below the lands 20 and intermediate the inclined side wall 14 of one of the grooves and the side wall 16 of an adjacent groove. The slits 28 extend inwardly an amount slightly above the plane or level of the base portions of the grooves 12. The slits 28 are typically formed by slitting tools, such as razor blades, for example, which may be employed simultaneously with the rotating cutter assembly 22; or alternatively, may be employed in a separate slitting operation or step either before or after the grooving operation.

A typical example of the dimensions of the grooves 12 and the slits 28 for a ¾″ thick board are as follows:

Depth of the groove 12 from the base 18 to the land
  20 _____ ⅜″
Width of the base 18 _____ ³⁄₁₆″
Angle of the side walls 14 and 16 from the vertical _____ 16°
Depth of the slit 28 from the under surface of the
  board 10 _____ ⁷⁄₁₆″
Distance between the center lines of adjacent bases
  18 _____ ⅞″

Figure 2:
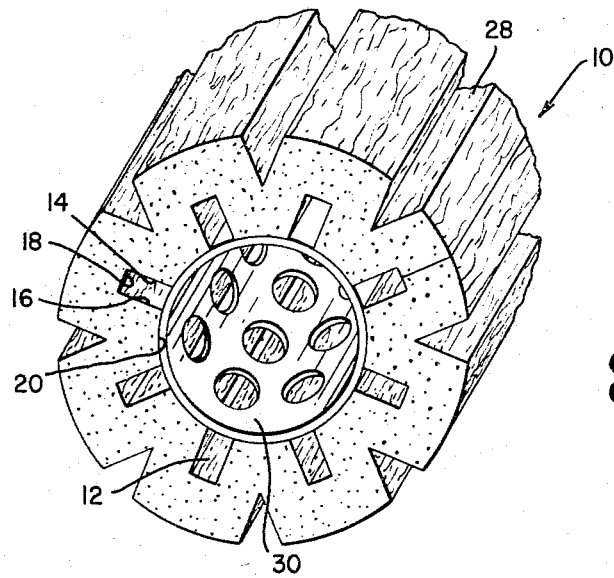
FIGURE 2 is a fragmentary perspective view of the product illustrated in FIGURE 1 after it has been wrapped upon a centrally disposed perforated supporting structure.

Upon completing of the grooving and slitting operations, the board 10 is cut into the desired lengths for assembly on a supporting structure such as a perforated metal sleeve 30, as clearly illustrated in FIGURE 2. In the assembled form, the side walls 14 and 16 of the grooves 12 assume positions which are substantially perpendicular to their respective bases 18, causing the grooves 12 to be substantially rectangular in section. Also, in the assembled form, the slits 28 open up to assume a substantially V-shaped cross-section.

The aforementioned grooving and slitting of the board 10 provides a core member which is easily and readily assembled by wrapping upon an inner cylinder without inducing undue stresses on the fibrous medium thereof. The arrangement also assures that the effective thickness of the completed core is substantially equal at all points throughout the length thereof.

Figure 3:
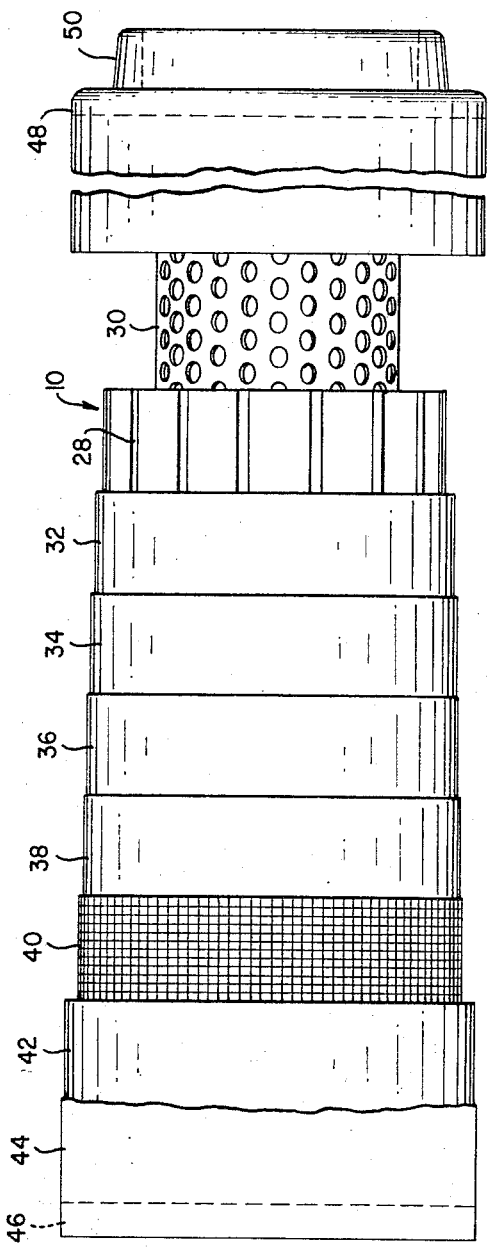
FIGURE 3 is an elevational view of a completed filter and coalescer element with portions cut away to illustrate more clearly the structure thereof.

After the grooved and slitted fibrous board 10 is wrapped about the perforated sleeve 30, it is held in place by any suitable means and additional outer layers of fibrous materials are wrapped concentrically thereabout to form an element such as illustrated in FIGURE 3. It will be understood that the completed element illustrated in FIGURE 3 is merely illustrative of one of many different arrangements which could be satisfactorily employed with the grooved and slitted inner core illustrated in FIGURE 2.

It has been found that satisfactory results have been obtained in a preferred embodiment wherein the board 10 was comprised of a resin bonded mass of glass fibers of an average diameter of .00055 inch, with the fibers being oriented parallel to one another. Other fiber dimensions may be employed with satisfactory results. It will be appreciated that the fiber orientation is an important feature of the invention. Since the grooves 12 are formed in parallel relation to the fibers, the grooving operation does not materially cut and thereby shorten the average length of the fibers. On the other hand, if the fiber orientation were random, the grooving operation would necessarily cut through the fibers disposed transversely of the zone of the groove, thereby rendering the lands between adjacent grooves extremely subject to physical damage. The lands 20 between adjacent grooves 12 in the present structure are inherently strong and can withstand considerable physical abuse.

With reference to FIGURE 3, there is shown a typical filter and coalescer element comprised of a plurality of generally coaxial superimposed layers 32, 34, 36, 38 and 42 of fibrous material, such as glass fibers. In the illustrated embodiment, the various layers of fibrous material are comprised of glass fibers having different diameters. For example, the fibers of the various layers of a preferred embodiment may have the following average fiber diameter characteristics:

| Layer: | Fiber glass diameter (inches) |
| --- | --- |
| 32 | .00022 |
| 34 | .00014 |
| 36 | .00009 |
| 38 | .00005 |
| 42 | .00022 |

A fiber glass screen wrap 40 is wrapped about the outer peripheral surface of the layer 38 and is typically employed to give overall strength characteristics to the element. The entire fibrous assembly is covered by a cloth sock wrapping 44, formed preferably of a cotton material.

A plastic material end cap structure is then integrally formed at one end of the filter and coalescer element to form a solid circular member blocking any flow therethrough. In fabricating the end cap 46, the one end of the filter and coalescer element is immersed in a liquid plastic material such as, for example, a thermosetting resin whereby the fibers of the ends of the various layers of fibrous material become immersed in the plastic and thereby form, upon curing, an excellent integral structure.

The other end of the filter and coalescer element is then immersed in a liquid resin until a portion of the resin flows into the fibrous media. The union of the plastic of the end cap and the fibrous media takes place simultaneously with the hardening of the plastic material. The outermost end of the end cap structure 48 is provided with an outwardly extending skirt 50 which may be provided with a smooth wall interior or may contain internal threads for securement to a threaded nipple of an associated tank in which the filter and coalescer element is adapted for final use. It will be understood that the end cap 48 and its associated skirt member 50 are hollow to provide fluid communication therethrough with the interior of the filter and coalescer element.

From the foregoing description, it will be evident that a liquid fuel may be caused to pass through the hollow end cap 48 into the interior of the filter and coalescer element. Then, the liquid fuel is caused to be passed transversely through the apertures of the sleeve 30, and then sequentially through the core 10, the fibrous layers 32, 34, 36, 38, the screen wrap 40, and finally through the layer 42 and associated outer sock 44. It will be understood, of course, that certain amounts of the particulate material which may flow with the transient liquid fuel will be collected by one or the other of the subsequent layers of fibrous material.

As the liquid fuel passes through the filter and coalescer element, any water admixed with the fuel is caused to coalesce in passing through the various layers of fibrous medium. The water is initially formed into rather small droplets which increase in size as they are forced outwardly by the transient fuel. The large droplets formed on the outer surface of the element drop downwardly and are typically collected within and periodically drawn off from a suitably arranged sump formed in the bottommost portion of the tank in which the filter and coalescer elements are housed. The clean, dry fuel, having a lower specific gravity than the water, may be drawn off from the top portion of the tank and may be used for fueling aircraft.

Figure 4:
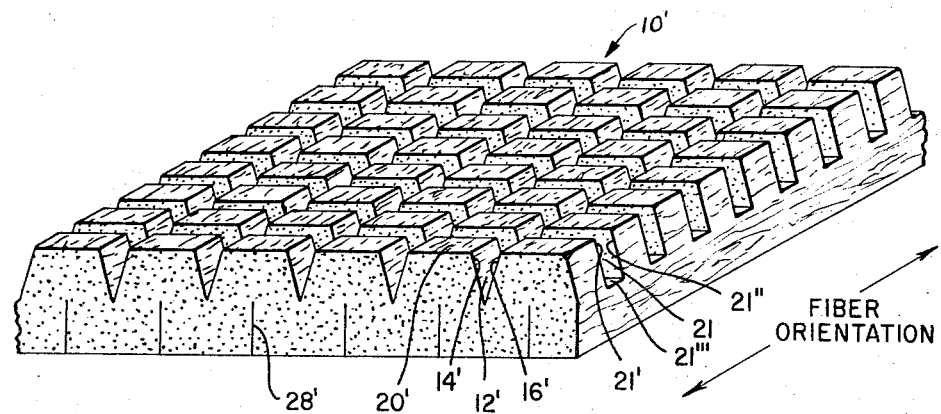
FIGURE 4 is a fragmentary perspective view of the product similar to the illustration of FIGURE 1, specifically showing the provision of transverse grooves.

FIGURE 4 illustrates a modification of the invention illustrated in FIGURES 1 through 3, inclusive, wherein there is shown a portion of a board, generally indicated by reference numeral 10', of fibrous material which has been suitably compressed and bonded with a thermosetting binding agent to a specific density and thickness. Preferably, the board 10' consists of glass fibers of generally parallel orientation bonded together by a phenol formaldehyde resin binder. The board 10' is provided with a plurality of parallelly disposed spaced apart grooves 12' of generally V-shaped cross sectional configuration and extending longitudinally of the board. Each of the grooves 12' has a pair of opposed inclined sidewalls 14' and 16'. Between the adjacent grooves 12', there is a remaining portion of fiber glass material of a generally truncated triangular shape in section having an upper land 20'. Further, the board 10' is provided with a plurality of parallelly disposed spaced apart grooves 21 extending generally transversely of the board and normal to the grooves 12'. Each of the grooves 21 has a pair of opposed sidewalls 21' and 21", and a base 21'''.

The grooves 12' and 21 are typically formed by a rotating cutter assembly similar to the assembly 22 of FIGURE 1 which has a plurality of spaced apart rotating cutter blades fixedly mounted to a rotating shaft member. Manifestly, the grooves 12' are formed in one operation, while the grooves 21 are formed in a subsequent operation. The depths of the grooves 12' and 21 typically range from ¼ to 9/16 of an inch.

The lower surface of the fibrous board 10' is provided with a plurality of parallelly extending spaced apart slits 28' which preferably are located below the lands 20' and intermediate the inclined sidewall 14' of one of the grooves 12' and the sidewall 16' of an adjacent groove. Typically, the slits 28' extend inwardly an amount slightly above the plane or level of the apex of the grooves 12'. The slits 28' may be formed by slitting tools, such as razor blades, for example, and may be employed simultaneously with the formation of the grooves 12' or may be employed in a separate slitting operation either before or after the grooving operation.

Upon the completion of the grooving and slitting operations, the board 10' is cut into the desired lengths for assembly on a supporting structure such as a perforated metal sleeve. In the assembled form, the board 10' assumes a generally cylindrical configuration with the sidewalls 14' and 16' of the grooves 12' caused to assume positions adjacent one another whereby the land portions 20' form a continuous annulus. Also, in the assembled form, it is to be understood that the annuli formed by the respective lands 20' are longitudinally spaced from one another by the annular grooves 21. Further, it will be understood that in the assembled form, the slits 28' open up to assume a substantially V-shaped cross section.

Figure 5:
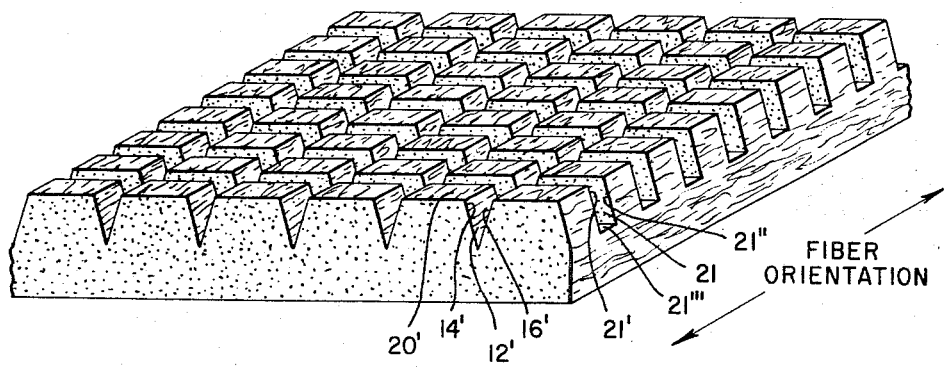
FIGURE 5 is a fragmentary perspective view of a modification of the structure illustrated in FIGURE 4 wherein the undersurface of the product is unslotted.

Referring to FIGURE 5, there is shown a modification of the structure illustrated in FIGURE 4 which is identical in all respects with the exception of the elimination of the slits on the undersurface of the board 10'. It has been found that in certain applications it is unnecessary to provide the slits in the under surface and the board may be merely formed into a cylindrical shape as explained with reference to the structure illustrated in FIGURE 4.

Among the advantages of the invention described above is the ability to form a filter and coalescer element having a cylindrical core portion fabricated from a board of fibrous material which has initially been compressed and bonded with a thermosetting binding agent to a predetermined density and thickness. The resultant structure can be manufactured at a substantial reduction in cost as compared to the existing methods of manufacture, since the structure can be produced from a production product of the manufacturer of the fibrous material without the requirement of the more expensive molding operation as required in United States Patent No. 3,061,107 referred to hereinabove. Further, the structure described herein can be fabricated with less elaborate tooling.

The provision of the grooves in the interior of the element affords a greater surface area for the liquid to be treated and thus increases the useful life thereof, militating against early clogging. It will be apparent that the multi-sided grooves provide an unusually extensive surface against which the fuel contacts. Thus by a simple expedient which can without difficulty be incorporated in the filter and coalescer element, the need for frequent replacement heretofore found necessary, is obviated.

According to the patent statutes, I have explained the principles and mode of operation of my invention, and have illustrated and described what I now consider to represent its best embodiment. However, I desire to have it understood that, within the scope of the appended claims, the invention may be practiced otherwise than as specifically illustrated and described.

What I claim is:

1. A liquid filter and coalescer element comprising a hollow cylindrical body of fibrous material, the fibers of said material being oriented to extend predominantly parallel to the longitudinal axis of said cylindrical body; a plurality of spaced apart grooves on the inner surface of said body and extending generally parallel to the fiber orientation and to the longitudinal axis of said cylindrical body substantially throughout the length thereof, said grooves having a depth of the order of one half the thickness of said body of fibrous material; a plurality of spaced apart slits on the outer surface of said cylindrical body and extending generally parallel to said grooves and being disposed to extend intermediate said grooves so that the innermost portion of each of said slits is interdigitated between the innermost portions of adjacent ones of said grooves; and means for causing the liquid to be filtered and coalesced to flow substantially in a radial direction through the element.

2. A liquid filter and coalescer element as defined in claim 1 wherein said grooves and said slits have a depth of the order of one half the thickness of said body, said grooves being multi-sided to afford increased surface area for the liquid to be treated.

3. A liquid filter and coalescer element as defined in claim 2 wherein said fibrous material consists of resin bonded fibers of glass.

References Cited

UNITED STATES PATENTS

| | | | |
|---|---|---|---|
| 2,781,913 | 2/1957 | Thompson | 210—496 X |
| 3,050,193 | 8/1962 | Gillick et al. | 210—497 X |
| 3,061,107 | 10/1962 | Taylor | 210—496 X |
| 3,209,916 | 10/1965 | May et al. | 210—496 X |
| 3,228,529 | 1/1966 | Gillick et al. | 210—457 |

REUBEN FRIEDMAN, *Primary Examiner.*

W. S. BRADBURY, *Assistant Examiner.*